Figure 1:
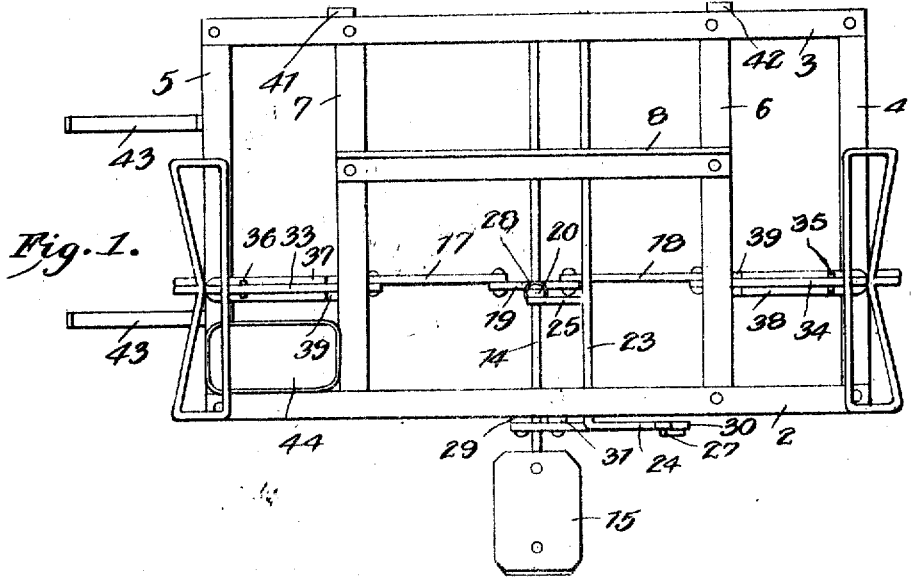

R. T. WOODRUFF & A. A. MACY.
MACHINE FOR HOLDING FRUIT BOXES FOR NAILING.
APPLICATION FILED AUG. 27, 1908.

933,282.

Patented Sept. 7, 1909.
2 SHEETS—SHEET 1.

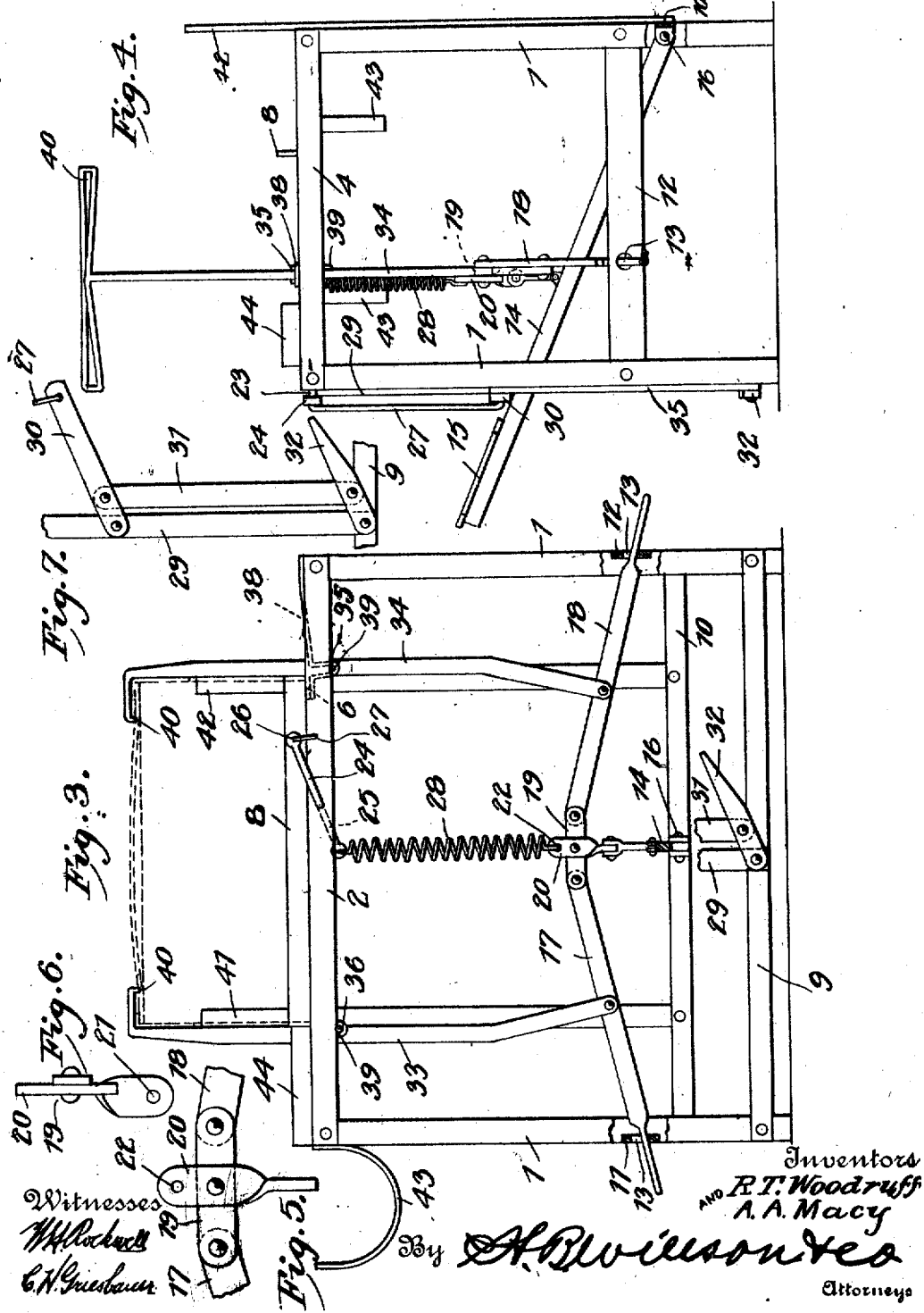

UNITED STATES PATENT OFFICE.

RAYMOND T. WOODRUFF AND ALLISON A. MACY, OF WENATCHEE, WASHINGTON, ASSIGNORS OF ONE-HALF TO JOHN H. BLAKE AND HERBERT M. ROYS, OF WENATCHEE, WASHINGTON.

MACHINE FOR HOLDING FRUIT-BOXES FOR NAILING.

933,282. Specification of Letters Patent. Patented Sept. 7, 1909.

Application filed August 27, 1908. Serial No. 450,542.

*To all whom it may concern:*

Be it known that we, RAYMOND T. WOODRUFF and ALLISON A. MACY, citizens of the United States, residing at Wenatchee, in the county of Chelan and State of Washington, have invented certain new and useful Improvements in Machines for Holding Fruit-Boxes for Nailing; and we do declare the following to be a full, clear, and exact description of the invention, such as will enable others skilled in the art to which it appertains to make and use the same.

This invention contemplates the construction of an improved machine for holding fruit boxes in position for nailing the tops thereon in such a manner that the sides of the box will be bulged outwardly while being held.

Fruits intended for shipment are required to be packed with what is known as the "forced" pack, which is accomplished by placing the fruit in layers in a suitable box, which is usually constructed rectangular in shape, and in such manner that the fruit will more than fill the box, extending slightly above the upper edges of the same to a distance of approximately one and one-half inches. When the fruit has been disposed of within a fruit box, so that it more than fills said box, the top boards are then laid upon the fruit and the vertical ends of the box are forced toward each other, thereby giving the sides of the box a slightly curved shape. The tops are then nailed to the ends of the box, and cleats nailed over the edges to more firmly secure the tops to the ends. The fruit prepared for shipment by the "forced" pack is not as likely to be injured by the jostling or moving of the fruit in the box after being packed, as is the case with fruit packed otherwise, and, consequently, it is very desirable to prepare various kinds of fruit, such as apples and oranges, for shipment with the "forced" pack.

Heretofore it has been difficult to conveniently manipulate a box filled to overflowing with fruit for packing in such a manner that the sides of the box could be bulged outwardly and the tops and cleats quickly and properly secured thereto.

One of the objects of this invention is the production of a machine which will efficiently compress a box filled with fruit and allow an operator to quickly and accurately nail a cover and reinforcing cleats thereon.

Another object of this invention is the production of a machine for holding fruit boxes for nailing, provided with means operated by foot pressure for forcing the ends of the box toward each other, said means being controlled by a friction clutch arranged to be released by a foot trip.

Another object of this invention is the production of a machine for holding boxes to be nailed provided with means for forcing the ends of a box toward each other in such a manner that the box will be held automatically in its forced position and the cover and cleats of said box may be quickly and accurately nailed to the box while the box is held in its forced position.

Figure 2:
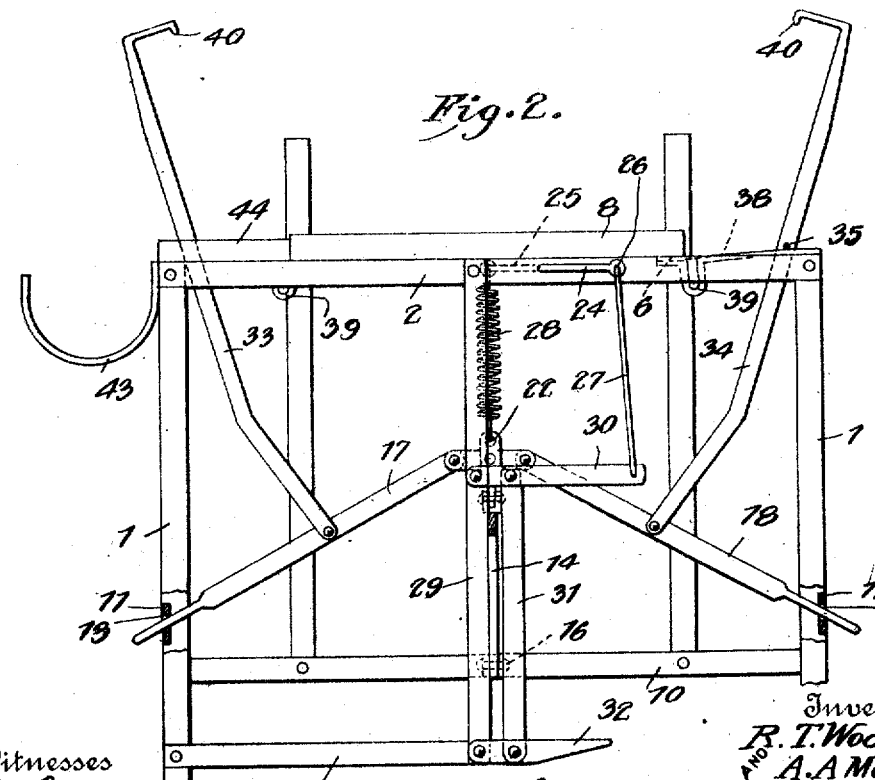

With these and other objects in view, the invention consists of certain novel features of construction, combination and arrangement of parts as will be described and particularly pointed out in the appended claims and in the drawings, in which, Figure 1 is a top plan view of our improved machine; Fig. 2 is a side elevation thereof, showing the gripping arms, which form a part of our invention, extended; Fig. 3 is a side elevation thereof, showing the gripping arms in closed position over a fruit box shown in dotted lines, and also showing certain parts broken away; Fig. 4 is an end elevation; Fig. 5 is a detail view of the toggle joint; Fig. 6 is another view of a toggle joint and Fig. 7 is a detail front elevation of a clutch.

Corresponding or like parts are referred to in the following description, and in all of the views of the drawings by the same reference characters.

The frame of our machine comprises standards, 1, which are formed preferably of angle iron, top cross bars, 2, 3, 4 and 5, which are mounted rigidly on the upper ends of the standards 1, in such a manner that the horizontal flanges of the top cross bars, which are formed of angle iron, will engage the vertical flanges of the standards. The top side bars, 2 and 3, are connected together intermediate of their ends by horizontal rails, 6 and 7, which are formed of angle iron, and with one of their flanges turned downwardly. A second rail, 8, crosses the rails 6 and 7, midway of their ends, and is formed with an upwardly-extending flange, and the same serves to limit or gage the position of the box on the frame, the lower ends of the front standards being connected by a brace 9, which is secured thereto at a slight distance from their ends. The remaining standards are secured at their lower ends by a backside brace, 10, which is connected to the standards at a distance slightly above the brace, 9. A plurality of end braces, 11 and 12, are connected to the standards and each of the end braces is formed with an oblique aperture, 13, through which the end of an operating rod is arranged to extend.

A foot lever, 14, which is formed with a foot plate, 15, is connected by a pivotal joint, 16, to back brace, 10, and said lever extends forwardly from said brace and at an angle thereto and to the front part of the frame. The lever 14 connects with a plurality of jointed bars, 17 and 18, which are formed with rounded ends arranged to extend through apertures formed in the end braces. The bars 17 and 18 are pivotally connected at their inner ends with a link, 19, which is provided with a pivotal member or vertical cross piece, 20. The vertical cross piece is formed with end apertures, 21, 22, and is arranged to be connected to the lever 14 by a bolt adapted to extend through the aperture 21.

A rod, 23, is mounted on the upper part of the frame and movable thereon, and said rod is formed at one end with an arm, 24, arranged on the outside of the frame, and a second arm, 25, extends laterally from the middle body portion of said rod in a direction opposite to arm 24. The arm, 24, is formed with an aperture, 26, through which the hooked end of a link, 27, extends. A vertically arranged coiled spring, 28, is hooked or connected at one end to the arm, 25, of the rod, 23, and extends downwardly therefrom to the vertical cross piece, 20, with which it is connected.

A vertical bar, 29, is rigidly mounted on the front side of the frame, and centrally thereof, and the foot lever, 14, is arranged to move against the vertical edge of said bar. A horizontal bar or link, 30, is pivotally mounted at one end on the vertical bar, 29, and is connected at its other end to the link, 27. The horizontal bar, 30, is pivotally connected with one end of a clutch bar, 31, which is arranged to be moved by the horizontal bar 30, against the sides of the lever, 14. A trip lever, 32, arranged to be operated by foot pressure, is pivotally connected at one end to the rigid vertical bar, 29, and adjacent to its pivotal connection to bar 29, said lever 32 is pivoted to the clutch bar, 31, being preferably connected to the lower ends of said bars 29 and 31. The trip lever, 32, is arranged to move the clutch bar 31 away from the lever, 14, which extends between said bar and the bar 29, at the will of an operator.

A plurality of gripping or clamping arms, 33 and 34, are pivotally connected to the bars, 17 and 18, midway of the ends of said bars and extend upwardly in angular relation to the standards and above the top cross bars. The arms, 33 and 34, are preferably arched at a point near their lower ends and are formed with transverse pins, 35, 36. The upper ends of the arms, 33 and 34, extend through guide members, 37 and 38, which are positioned on opposite ends of the upper portion of the frame, and each of said guide members is secured to the upper portion of the frame so that its outer end will be higher than its inner end, and each of the guide members is formed with a loop, 39, which extends downwardly from the body portion thereof at an oblique angle thereto. The gripping arms, 33 and 34, are arranged to be moved toward each other, when the lever 14, is depressed, and as the gripping arms, 33 and 34, are moved inwardly by the depression of the foot lever, 14, operating the bars, 17 and 18, the pins, 35 and 36, of the gripping arms will ride over the guide members 37 and 38, and drop into the loops, 39, of said members. The upper ends of the gripping arms, 33 and 34, are bent at approximately right-angles to the body portion of the arms, and each formed with a downwardly bent cleat-engaging portion, 40. The upper ends of the arms, 33 and 34, are also formed with openings arranged to permit an operator to freely insert nails through the ends of said arms and against a box top.

The frame of our machine is preferably provided with vertical bars, 41 and 42, which are secured to the back portion of the frame, and extend above the top thereof. Said bars are arranged to serve as stops for box tops which may be positioned on the top of the frame, and against the vertical bars, 41 and 42. The frame is also provided with a rack, 43, adapted to receive cleats for use in topping boxes, and a nail box, 44, for holding nails within easy reach of the left-hand of the operator.

When an operator desires to top a box with our machine, an empty box is arranged on the upper portion or table of the frame, and against the gage rail, 8, and the same is filled with fruit so that the fruit will extend slightly above the upper edges of the box. A top is then placed on the fruit and cleats placed on the ends of the top and practically simultaneously with the placing of the cleats on the top, the foot lever, 14, is depressed so that the gripping arms, 33 and 34, will be swung inwardly and their upper bent ends will engage the box top and the cleats, and the ends of the box will be forced toward each other by the pressure which is exerted upon the foot lever, 14. As the foot lever 14 is depressed, the spring, 28, will be extended and the rod, 23, rocked on the frame, thereby raising the link, 27, and forcing the clutch bar, 31, against the lever, 14. As the clutch bar, 31, engages the flat side of the lever, 14, said lever will be prevented from moving back to its normal position by frictional engagement with said clutch bar. The clutch bar, 31, may be formed with clutch teeth arranged to engage corresponding clutch teeth formed in the lever, 14, but it is considered best to form the clutch bar without such teeth. When the box top and cleats have been properly nailed to the box, pressure is applied to the trip lever, 32, and the clutch bar, 31, moved away from engagement with the lever, 14, so that the spring, 28, will raise the lever, 14, to its normal position, thereby opening or expanding the gripping arms, 33 and 34. The movement of the gripping arms, 33 and 34, and the lever, 14, will cause the rounded ends of the bars, 17 and 18, to slide in the apertures formed in the end braces 12 and 13. The gripping arms 33 and 34 are bent near their lower ends to throw the center of gravity outside of the point where said arms are pivoted to the bars, 17 and 18, so that when the foot lever is in its elevated position, the arms, by force of gravity alone, will be caused to fall in opposite directions until stopped by the guides, 37 and 38.

If desired the flanges of the cross piece secured to the frame may be suitably notched for the reception of locking means for securing the gripping arms in closed position.

Our machine provides for a better way of placing the cleats than the existing machines, giving a greater convenience to the operator in nailing down the box top. Moreover, it does away with the defective clutch mechanism in use, and provides for the release of the gripping arms from their closed position, and the foot lever from its depressed position, which means may be operated by foot pressure. It dispenses with the springs for forcing the gripping arms into position for gripping the box top and increases the leverage which may be exerted upon said arms without complicating the operation in any way. The frictional engagement of the lever with the frictional clutch bar assures an accurate and positive control of the gripping arms, thereby keeping the ends of the box securely pressed toward each other and holding the cover and the cleats of the box against the upper edges thereof so that an operator may quickly and properly nail the cleats and cover to the box edges.

Our improved machine overcomes all of the principal difficulties of the existing machines, and permits of the more rapid handling of fruit boxes and the quick nailing of covers and cleats thereto.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim as new and desire to secure by Letters Patent, is:

1. A frame formed of angle iron, said frame being formed with rails for guiding a box thereon, gripping arms formed with looped ends whereby nails may be inserted therebetween and arranged on the frame, lateral pins secured to the gripping arms, guides formed with loops for the reception of the lateral pins and for guiding the movement of the gripping arms and pins, means for supporting the gripping arms whereby said arms are held normally extended, and means operated by foot pressure for holding and releasing the gripping arms.

2. A frame of angle iron, cross bars mounted on the frame for supporting a box, means for forcing the ends of the box toward each other, a frictional clutch for holding the arms in a closed position, and a foot trip for releasing the frictional clutch.

3. A frame provided with means for supporting a box, guides mounted on the upper portion of the frame, gripping members extending through the guides, means for forcing the gripping members toward each other, means for securing the gripping members on the frame adapted to hold said members to allow said members to fall apart, a frictional clutch for engaging the forcing means, and a foot trip for releasing the frictional clutch.

4. A frame, a plurality of gripping members, movable on the frame, each of said members being formed with an end arranged to engage a cleat and a box top, and with an opening in said end for permitting an operator to freely nail a box top, bars pivotally linked to each other and pivotally connected to the gripping arms, said bars being formed with rounded ends slidable on the frame, a foot lever forming a connection with the bars, a clutch mechanism for preventing the foot lever from returning to its normal position, a spring for returning the lever to its normal position, and means for releasing the clutch mechanism.

5. Means for supporting a box, means for forcing the ends of the box toward each other, and clutch means automatically operated to clutch and manually-operated to release the forcing means.

6. Means for supporting a box, means for gripping the ends of the box, means for forcing the gripping means toward each other, and frictional clutch means automatically operated for gripping the forcing means to hold the same in a fixed position and manually-operated to effect the release of said gripping means from said position.

7. Means for supporting a box, gripping means extending above the supporting means, means for supporting the gripping means extended, means for forcing the gripping means toward each other guides for the gripping means, and pins carried by the gripping means movably on the guides.

8. A frame, a plurality of gripping arms supported on the frame, a foot lever pivotally mounted on the frame for forcing the upper portions of the gripping arms toward each other, and link bars slidably mounted on the frame for connecting the lever to the gripping arms.

9. A frame, a plurality of gripping arms extending above the frame and supported thereon, each of the arms being provided with pins extending through the upper end portions, and slotted guides formed with downwardly looped portions for guiding the movements of the gripping arms.

10. A frame, a plurality of gripping arms formed with cleat-engaging ends, and pivotally supported on the frame, slotted members for guiding the movement of the gripping arms, a foot lever for forcing the upper ends of the gripping arms toward each other, and a clutch connected to be moved on the depression of said foot lever into engagement with said lever for holding it in depressed position.

11. A frame, a plurality of gripping arms supported on the frame, a plurality of links connected to the gripping arms, a foot lever pivotally mounted at its rear end on the frame having connections with the links, a clutch indirectly operated by the foot lever for holding said lever in a depressed position, and a foot release for releasing the clutch from engagement with the lever.

12. A frame, a plurality of gripping arms supported on the frame, each of the gripping arms being provided with pins extending through their upper portions, a plurality of guides mounted on the frame engaging the pins, a plurality of links connected to the gripping arms, a lever connected with said links pivotally connected at its rear end to the frame for operating said links, a clutch bar arranged to engage the side of the lever, and a bar pivotally mounted on the lower end of the frame arranged to engage the clutch bar and adapted to be operated by foot pressure.

13. A frame, a plurality of gripping arms extended above the frame and supported thereon, slotted guides mounted in the frame engaging the upper portions of the gripping arms, each of the guides being formed with downwardly inclined loops arranged to receive pins formed on the gripping bars, a lever for moving the upper ends of the gripping arms toward each other, a spring connected to the lever, a plurality of links formed with a toggle joint connected to the lever, a movable rod arranged on the frame having connections with the spring, a clutch operated by the rod for holding the lever in its depressed position, and a bar pivotally mounted on the frame for releasing the clutch from engagement with the foot lever.

In testimony whereof we have hereunto set our hands in presence of two subscribing witnesses.

RAYMOND T. WOODRUFF.
ALLISON A. MACY.

Witnesses as to Raymond T. Woodruff:
B. J. STEPHENSON,
L. F. BRETTANS.

Witnesses as to Allison A. Macy:
C. W. BRONNFULD,
R. H. LORD.